May 22, 1951     C. J. JENSEN     2,553,712
SLIP-PREVENTING ATTACHMENT FOR VEHICLE WHEELS
Filed May 15, 1947
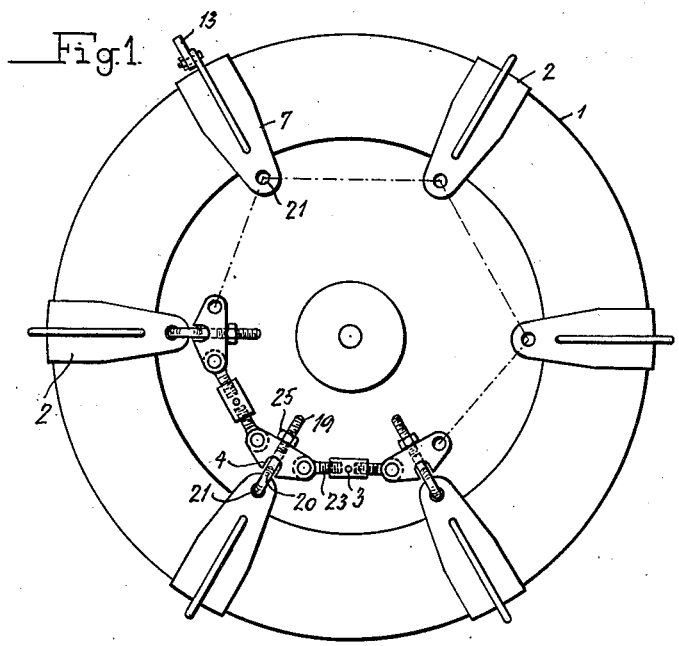
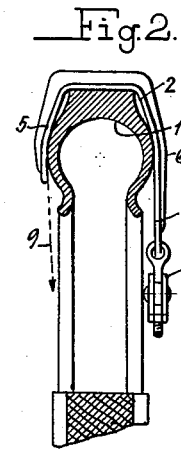
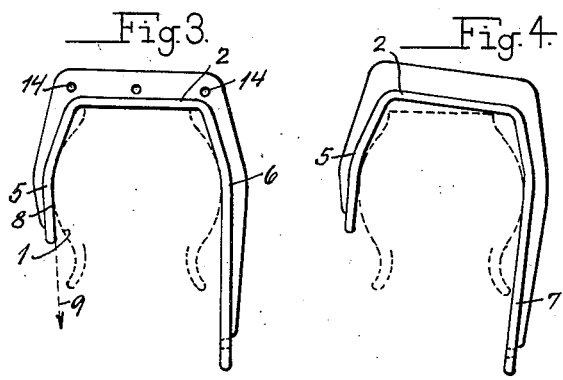
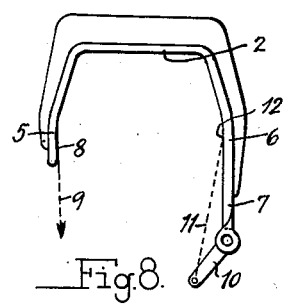
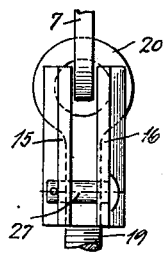
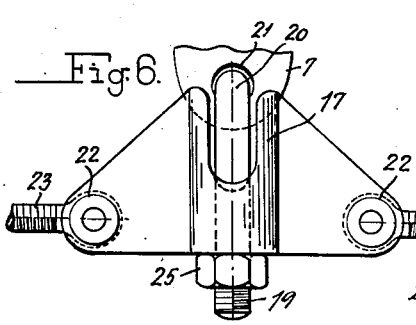
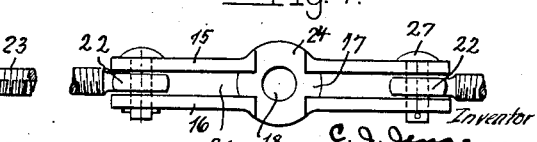
Inventor
C. J. Jensen
By Watson, Cole, Grindle & Watson Att'ys Patented May 22, 1951

2,553,712

UNITED STATES PATENT OFFICE 2,553,712

SLIP-PREVENTING ATTACHMENT FOR VEHICLE WHEELS

Carl Jensenius Jensen, Copenhagen, Denmark

Application May 15, 1947, Serial No. 748,156

3 Claims. (Cl. 152—228)

The present invention relates to mud hooks of the kind adapted for use in slip-preventing attachments for vehicle wheels, particularly automobile or tractor wheels, and each comprising a U-shaped member provided on its outer face with a radially projecting traction rib. A number of such hooks are connected with each other inwardly of the periphery of the wheel by means of interlinking means which are not connected with the wheel proper and which comprise or are connected with the individual hooks by means of members for tightening the slip-preventing attachment formed by the mud hooks round the tyre of the wheel.

As distinct from the known slip-preventing attachments of similar construction but in which the hooks are attached to the hub of the wheel, a slip-preventing attachment in which the interlinking means between the hooks are independent of the wheel presents the advantage that no connection whatever is necessary between the wheel and the hooks in order to keep the latter in position round the tyre of the wheel.

In the known slip-preventing attachments of this kind it is necessary to mount the interlinking means between the hooks on both sides of the wheel in order to secure that the hooks remain in position in operation.

On account of the necessity of employing interconnecting means between the hooks on both sides of the wheel it is sometimes difficult to mount slip-preventing attachments of the said kind because the inner side of a wheel, e. g. automobile wheel is frequently accessible only with great difficulty, and for the same reason such slip-preventing attachments cannot be used in connection with twin wheels, i. e. wheels mounted in pairs on a common axle or shaft in close relationship and with their rubber tyres in contact with each other.

The present invention has for its object to remedy these drawbacks, and to this end, according to the invention, the hooks are constructed in such a manner as to enable them to be kept in position on the rubber tyre by a one-side tightening, i. e. by the employment of interlinking means between the hooks on one side only—usually on the outer side—of the wheel. According to the invention, one end of the portion of the hook serving to engage over the rubber tyre is constructed as an arm projecting radially inwards of the wheel and having its free end situated in such a position relatively to the remaining part of the hook that the tyre engaging surface at the other free end of the hook converges, towards the centre of the wheel, on the direction of the said arm or, if the latter is not rectilinear, on the direction of the shortest distance from the free end of the arm to the point of same at which the adjacent portions of the hook engage the tyre. The said arm may either be an integral part of the hook, or it may be composed of such integral part and a laterally projecting arm attached to the latter.

When a number of hooks of this kind are arranged round the tyre of a wheel at suitable, preferably equal spacings along the periphery of the wheel and the interlinking means serving to connect the hooks with each other on one side of the wheel are suspended between the free ends of the said arms of the hooks, a tightening of the ring formed by these interlinking means will cause the hooks, while being drawn firmly against the periphery of the tyre, at the same time to be rotated transversely of the tyre whereby the ends of the hooks contacting with the other side of the tyre are caused to firmly engage with the lateral surface of the rubber tyre. In this way, as practical tests have shown, the hooks will be held securely in position during driving.

The interlinking means between the said arms of the hooks may in known manner comprise means for tightening the closed ring or chain formed by the interlinking means and their connections with the hook arms. These tightening means may e. g. consist of turnbuckles. However, it is also possible to provide adjustable means in the connection between each hook and the said chain, whereby, after the said chain of interlinking means has been brought in position, each hook may be individually tightened by being drawn radially inwards. In this case the said chain may be constructed without means for tightening same, e. g. in the form of an ordinary chain consisting of interengaging annular links and closed so as to form a ring with which each of the hooks is connected e. g. by means of a radially disposed eye-bolt as will be described more fully in the following. According to the invention, the said traction rib on the outer side of the hooks may be interchangeable so that a higher or lower rib may be attached as desired, or a worn-out rib may be exchanged. The connection with the remaining part of the hook may be effected in any suitable manner as by a bolt and nut connection.

But in order that my invention may be better understood, reference will now be made to the accompanying drawing in which Fig. 1 shows a slip-preventing attachment in position on an automobile wheel in side elevation, Fig. 2 a cross section through part of a rubber tyre with a hook engaging over same, Figs. 3-4 a hook in two different positions on a rubber tyre, Fig. 5 a modified construction of a hook in side elevation, and Figs. 6-8 on an enlarged scale and in side elevation, plan view and end elevation respectively a tightening member for adjustably connecting a hook with the chain used for assembling slip-preventing attachments of the kind shown in Fig. 1.

In Fig. 1, the numeral 1 represents the rubber tyre of an automobile wheel, 2 a plurality (in the embodiment shown, six), U-shaped or hook-shaped members engaging over the tyre. These members, in the following to be referred to as hooks, are uniformly spaced along the circumference of the wheel and held together by means of links 3 and connecting members 4. In Fig. 1 the links 3 are constructed as turnbuckles, but they may be replaced by links of other kind, e. g. ordinary chain links, provided the connecting members 4 are adjustable as will be described below.

The shape of the hooks 2 will be apparent from Fig. 3. Each hook has two legs 5 and 6, of which the latter has an extension 7 projecting radially of the wheel towards its axis and forming an arm connecting the hook with the respective connecting member 4.

The direction of the arm 7 relatively to the direction of extent 9 (Figs. 2 and 3), of the engaging surface of the free end of the leg 5, with which surface such leg contacts with the rubber tyre 1, is such that these two directions converge towards the centre of the wheel, in other words form an acute angle between them. This arrangement has the effect that when the hooks have been loosely applied to the rubber tyre, e. g. as shown in Fig. 4, and are then forced into firmer contact with the said tyre by tightening the chain formed by the members 3 and 4, e. g. by turning the turnbuckles 3, the hooks will be subjected to a force P, Fig. 4, resulting from the tightening of the said chain and tending to turn the arm 7 away from the wheel and thereby forcing the leg 5 partly to slide down the rubber tyre and partly to be firmly pressed against the tyre with its free end, whereby the hook is so firmly secured that dislocation of same in operation is practically excluded.

In the embodiment shown in Fig. 5 the portion of the arm 7 adjacent to the leg 6 is parallel to the leg 5, while the free end 10 of the arm 7 is directed at an angle inwardly towards the wheel and either forms an integral part of the arm 7 or a separate member fixed to or slid on to the arm 7 and incapable of turning away from its inclined position relatively to the arm 7, to which it is coupled or hinged in suitable manner, so that the direction of the shortest distance between the point 12 of the leg 6 from which the arm 7 starts and the free end of the arm portion 10, as indicated by the dotted line 11 in Fig. 5, converges on the extended engaging surface 8 of the leg 5, as indicated by the dotted line 9. When the hook is drawn on to the tyre, it is turned from the position shown in Fig. 2 to the position shown in Fig. 3 relatively to the tyre.

As appears from Figs. 1 and 5, the hook is provided on its outer face with a radially projecting traction rib 12 that may be integral with the hook proper or consist of a detachable member 13 as shown in dotted lines in Fig. 1, which member is connected with the hook by means such as bolts passing through holes 14, Fig. 3, of a radially projecting, transversely disposed low traction rib provided on the outer face of the hook.

As stated above, the hooks are drawn firmly against by turning the turnbuckles 3, but it is also possible to draw the hooks on to the tyre in different manner, e. g. by constructing the connecting members 4 in the manner indicated in Figs. 1 and 6-8. These connecting members consist mainly of two mutually parallel triangular plates 15 and 16, Figs. 6 and 7, which at their centre are mutually connected by means of a boss 17 having a bore 18 through which the threaded portion 19, Fig. 6, of an eye-bolt 19, 20 extends. The eye 20 of this bolt engages with holes 21, Figs. 1 and 6, of the arm 7 of the hook. On each side of the boss 17, the eye 22 of another eye-bolt 23 engages between the two plates 15 and 16. The eye-bolt 23 may e. g. be part of one of the turnbuckles 3 shown in Fig. 1. At the side facing the arm 7 the plates 15, 16 and the boss 17 are provided with a slot 24 extending transversely of the member formed by the plates 15 and 16 and the boss 17 and having such a width that this slot may be slid along the eye-bolt by turning a nut 25, Figs. 1 and 6, on the eye-bolt. At the same time the shank 7 of the hook 2 is drawn into the space 26 between the two plates 15 and 16. In this manner the member 4, Fig. 1, or the members 15, 16, 17, Figs. 6-8, is accurately guided relatively to the hook, and by turning the nut 25 the hook may be drawn radially inwards toward the respective link 4 in the chain formed by the links 4 and the members 3 after the chain has been assembled to a ring that has no other connection with the wheel than that established by way of the eye-bolts 20 and the hooks 2. In this embodiment of the invention the links 3 in the form of turnbuckles may be replaced by ordinary chain links.

Having now particularly described and ascertained the nature of my invention and in what manner the same is to be performed I declare that what I claim is:

1. A slip-preventing attachment for vehicle wheels comprising a plurality of tire-engaging mud hooks, a linking structure arranged for connection with the shanks of said mud hooks on one side of the wheel, a connecting member between each of said shanks and said linking structure, and means preventing any substantial angular movements of said hooks about a radial axis, the means restraining angular movements of a hook about a radial axis consisting of an eye-bolt having its eye in engagement with a hole in the respective shank and extending through said connecting member and having a nut screwed onto its straight end, and said connecting member having a first slot for receiving the head of said eye-bolt and a second slot at right angles thereto for receiving the end of said shank.

2. A slip-preventing attachment as in claim 1 and in which said connecting member consists of two spaced flanges and a boss connecting said flanges, said first slot being provided in said boss at one end of the latter and having its side walls flush with the mutually facing surfaces of said two flanges, and said second slot being likewise provided in said boss at the same end of the latter.

3. A slip-preventing attachment as in claim 2 and comprising pins extending between said spaced plates for engagement with the linking means linking the said connecting member with the two connecting members adjacent thereto.

CARL JENSENIUS JENSEN.

REFERENCES CITED

The following references are of record in the file of this patent:

UNITED STATES PATENTS

| Number | Name | Date |
|---|---|---|
| 1,213,410 | Powell | Jan. 23, 1917 |
| 1,329,628 | Poorman | Feb. 3, 1920 |
| 2,093,404 | Akins | Sept. 21, 1937 |
| 2,198,906 | Conway | Apr. 30, 1940 |
| 2,352,788 | Hinds | July 4, 1944 |
| 2,467,654 | Boje | Apr. 19, 1949 |